United States Patent
Lee et al.

(10) Patent No.: US 6,790,898 B2
(45) Date of Patent: Sep. 14, 2004

(54) PREPARATION OF FLUORINATED CORE-SHELL PARTICLES WITH WATER AND OIL REPELLENCY

(75) Inventors: Soo-Bok Lee, Daejeon (KR); In Jun Park, Daejeon (KR); Dong-Kwon Kim, Daejeon (KR); Jeong-Hoon Kim, Daejeon (KR); Kwang Won Lee, Daejeon (KR); Jong-Wook Ha, Seoul (KR)

(73) Assignee: Korea Research Institute of Chemical Technology, Daejeon (KR)

(*) Notice: Subject to any disclaimer, the term of this patent is extended or adjusted under 35 U.S.C. 154(b) by 96 days.

(21) Appl. No.: 10/307,472

(22) Filed: Dec. 2, 2002

(65) Prior Publication Data

US 2003/0118722 A1 Jun. 26, 2003

(30) Foreign Application Priority Data

Dec. 4, 2001 (KR) .................... 2001-76243

(51) Int. Cl.$^7$ .............. C09D 5/02; C09D 127/12; C09D 133/16; C09D 151/00; C09D 157/08
(52) U.S. Cl. .............. 524/458; 524/544; 524/545; 524/566; 524/805; 525/276; 525/902; 526/201; 526/242; 526/245
(58) Field of Search .............. 524/458, 544, 524/545, 566, 805; 525/276, 902; 526/201, 242, 245

(56) References Cited

U.S. PATENT DOCUMENTS 5,798,406 A * 8/1998 Feret et al. .......... 524/501

FOREIGN PATENT DOCUMENTS

| JP | 6-192342 | 7/1994 | | |
|----|----------|--------|---|---|
| JP | 06192342 A | * | 7/1994 | ......... C08F/220/22 |

OTHER PUBLICATIONS

Pierre Marion, et al., "Core–Shell Latex Particles Containing a Fluorinated Polymer in the Shell, 2. Internal Structure Studied by Fluorescence Nonradiative Energy Transfer", *Macromolecules*, vol. 30, No. 1, pp. 123–129, (1997).

R.R. Thomas, et al., "Low Free Energy Surfaces Using Blends of Fluorinated Acrylic Copolymer and Hydrocarbon Acrylic Copolymer Latexes", *Macromolecules*, vol. 33, No. 23, pp. 8828–8841, (2000).

* cited by examiner

*Primary Examiner*—Kelechi C. Egwim
(74) *Attorney, Agent, or Firm*—Finnegan, Henderson, Farabow, Garrett & Dunner, L.L.P.

(57) ABSTRACT

The present invention relates to preparation of fluorinated core-shell particles with water and oil repellency, and more particularly, to preparation of emulsion-type coating material with good water and oil repellency using only small amount of expensive fluorinated monomers, which comprise a shell wherein a large amount of hydrophobic fluorinated monomers are included and a core wherein no fluorinated monomers are included.

6 Claims, No Drawings

PREPARATION OF FLUORINATED CORE-SHELL PARTICLES WITH WATER AND OIL REPELLENCY

BACKGROUND OF THE INVENTION

1. Field of the Invention

The present invention relates to preparation of fluorinated core-shell particles with water and oil repellency, and more particularly, to preparation of emulsion-type coating materials with good water and oil repellency using only small amount of expensive fluorinated monomer, which comprise a shell wherein a large amount of hydrophobic fluorinated monomers are included and a core wherein no fluorinated monomers are included.

The emulsion technique is applied in many uses such as painting, adhesives, textiles, fine chemistry, electric/electronic, automotives and metal industries. In the emulsion technique, the surfactant polymer materials are generally dispersed in water as superfine polymer particles. These emulsion polymers usually contain organic solvents. However, recent environmental regulations started to employ more strict measures on volatile organic solvents to require transition to emulsion polymers not to contain organic solvents.

Hydrophobic emulsion materials are very useful because they provide various materials with superior properties, such as water repellency, oil repellency, anti-fouling property, lubrication property, non-sticking property and low surface tension. These hydrophobic polymer materials can be prepared from fluorinated monomer monomers with perfluorinated groups. The perfluorinated group $[CF_3(CF_2)_n(CH_2)_2-]$ contained in these fluorinated monomers shows an extreme hydorphobicity. That is, the critical surface tension is about 8 dynes/cm and the surface energy is the lowest in all existing compounds. Because this perfluorinated group has very low surface energy, it is oriented toward air at the air/material interface. Therefore, materials containing this perfluorinated group become hydrophobic. For this reason, a molecular structure which assures effective orientation of the perfluorinated group at the outermost air/material interface is very important in the development of hydrophobic functional polymer materials.

Because particle size of the conventional hydrophobic emulsion materials is relatively large as 2–3 μm, they do not penetrate into substrates effectively and the surface orientation of the perfluorinated group is insufficient. And, use of a large amount (more than 50 wt %) of expensive fluorinated monomers to obtain hydrophobic increases the production cost. Also, organic solvents including acetone are used to enhance penetration to substrates and film forming property. However, as mentioned earlier, the environmental regulations about organic solvents require products not containing organic solvents.

One of the ways to reduce the amount of the fluorinated monomer and orient it at the outermost air/material interface is to make the emulsion particle in a core-shell structure. That is, the emulsion particle is given a core-shell structure, wherein the shell contains many perfluorinated groups and the core contains few or no perfluorinated groups. In this hydrophobic functional material with core-shell structure, the hydrophobic shell is oriented at the outermost air/material interface of the substrate surface and the core is oriented inside of the surface, so that superior hydorphobicity can be obtained by small fluorinated monomer content. Because of this, it becomes possible to improve efficiency of the hydrophobic functional material while reducing production cost.

2. Description of the Prior Art

It is known that preparation method and condition are very important in producing particles with a core-shell structure. The common methods are particle swelling and multi-stage semicontinuous emulsion polymerization. In the particle swelling method, particles with a variety of structures such as inverse core-shell structure are obtained in addition to the core-shell structure, depending on the thermodynamic properties of monomers and intermediates, and the polymerization condition kind like surfactant and concentration. In the multi-stage semicontinuous emulsion polymerization, the core latex is emulsion polymerized individually and swollen on particles to form shells for a long time. Then, the reaction is initiated or monomers are added continuously after adding an initiator. In both methods, the possibility of particle formation due to secondary nucleation cannot be excluded because the shell is formed by adding initiators.

Known techniques of preparing core-shell structure particles are as follows. U.S. Pat. No. 5,798,406 and Japanese Pat. No. 6,192,342 disclose preparation of core-shell particles wherein monomers containing perfluorinated groups are included in the shell. However, the surface quality of thus prepared particles are poorer than that of particles with perfluorinated groups only. That is, the contact angle to water is below 110°, which is smaller than that of perfluorinated group (about 120°). Also, in this case, the oil repellency is predicted to be very low. Preparation of particles containing fluorinated monomers in the shell through 3-stage emulsion polymerization is reported [Marion, et al., *Macromolecules*, 30, 123(1997)]. However, in this method, the fluorinated monomers are used more than 20 w % of particles and the final particle size reaches about 300 nm. Preparation of core-shell particles with superior water repellency through multi-stage emulsion polymerization is reported [Thomas, et al., *Macromolecules*, 33, 8828(2000)]. In this method, the monomers having perfluorinated groups are used less than 10 w % of total particles. However, the preparation process is rather complicated because it comprises many stages. In the cited literatures, an anionic surfactant alone or a mixture of an anionic surfactant and a non-ionic surfactant is used as an emulsifying agent. This is effective in monomer emulsification as well as particle suitability, but it may cause poor adhesion of particles to the substrate.

SUMMARY OF THE INVENTION

The inventors of the present invention made efforts to overcome the above-mentioned drawbacks of the conventional fluorinated hydrophobic emulsion coating materials. The present invention was completed by preparing coating particles with core-shell structure, wherein a large amount of hydrophobic fluorinated monomers are contained in the shell and no fluorinated monomers are contained in the core.

Accordingly, an object of this invention is to provide a method of preparing core-shell coating material with superior water and oil repellency using small amount of expensive fluorinated monomers, wherein a large amount of fluorinated monomers are contained in the shell.

DETAILED DESCRIPTION OF THE INVENTION

The present invention is characterized by preparation of fluorinated coating material with core-shell structure, which comprises: 1) a step of emulsion polymerizing core latex by using a monomer selected from a group consisting of acrylate-based, methacrylate-based, styrene-based and vinyl-based monomers, a surfactant, distilled water, a chain transfer agent and a water-soluble initiator; and 2) a step of obtaining the core-shell particles by adding the fluorinated monomer only or mixture of fluorinated monomer and comonomer to the shell, when the transition ratio of the monomers to intermediates is in the range of 70–95%.

Hereunder is given a more detailed description of the present invention.

The present invention relates to preparation of coating particles with a core-shell structure, wherein a large amount of fluorinated monomers are contained in the shell and no fluorinated monomers are contained in the core. In this way, functional coating material with good water repellency, oil repellency and film formation property can be obtained while reducing use of expensive fluorinated monomers. Also, this method is environment-friendly because no organic solvent is used. Especially, this invention is characterized by preparation of core-shell particles by initiating core latex polymerization by emulsion polymerization and adding fluorinated monomer only or fluorinated monomer and other comonomer continuously before the reaction is completed.

Hereunder is given a more detailed description of each preparation step.

The first step is preparation of core which does not contain fluorinated monomers. An emulsion polymerizable monomer and a chain transfer agent are emulsified with surfactant in distilled water. Then, a water-soluble initiator is added to initiate reaction to obtain the core latex. More specifically, the emulsification solution is emulsified with a supersonic emulsifier. Then, it is inserted in a reactor and nitrogen atmosphere is provided by adding nitrogen gas. The reactor temperature is raised to 50–85° C. using an oil bath. Then, water-soluble initiator is added to initiate the reaction.

For the monomer to prepare the core latex, any emulsion polymerizable monomer can be used. For example, acryl monomers like methyl acrylate, ethyl acrylate, butyl acrylate, hexyl acrylate, ethylhexyl acrylate, octyl acrylate, lauryl acrylate, octadecyl acrylate and glycidyl acrylate; methacrylate monomers like methyl methacrylate, ethyl methacrylate, butyl methacrylate, ethylhexyl methacrylate, lauryl methacrylate, octadecyl methacrylate, benzyl methacrylate and glycidyl methacrylate; styrene monomers like styrene, chlorostyrene and bromostyrene; and vinyl monomers like vinyl acetate and vinyl pyridine can be used. The monomer is recommended to be contained in the core latex in 10–40 wt %. If the content is below 10 wt % the productivity is poor, and otherwise if it exceeds 40 wt % the physical property worsens because excessive surfactant is required to stabilize the emulsion.

For the surfactant, anionic surfactants like sodium lauryl sulfate; cationic surfactants like tetradecyl trimethyl ammonium bromide, hexadecyl trimethyl ammonium bromide and stearyl trimethyl ammonium chloride; and non-ionic surfactants like nonyl phenyl ether can be used. In particular, cationic surfactants are recommended in the present invention in order to improve adhesion of the coating material to substrate.

Reaction ratio of the monomer and the surfactant is preferable to be 1:0.001–0.2 in weight, and 1:0.005–1:0.1 is more preferable. If the reaction ratio falls off this range, the emulsion may become unstable.

For the water-soluble initiator, persulfates like ammonium persulfate, sodium persulfate and potassium persulate and azo initiators like 4,4-azobis(4-cyanovaleric acid)), azobis (2-amidinopropane) dihydrochloride can be used. It is recommended to be used in 0.1–5 wt % and more preferably in 0.5–2 wt % of the monomer.

For the chain transfer agent, the one commonly used in emulsion polymerization can be used.

The next step is synthesis of the core-shell particle. When the convertion ratio from the monomers to intermediates reaches 70–95% in the first step, fluorinated monomer only or mixture of fluorinated monomer and comonomer is added to the shell to obtain the core-shell particle. If the transition ratio is below 70% unreacted monomers are copolymerized together with fluorinated monomers, so that random copolymer particles are obtained rather than core-shell particles. This can be the cause of poor surface property. Theoretically, it is desirable to add the monomers at the moment when the transition ratio reaches 100%. However, in practice, the moment cannot be predicted.

For the fluorinated monomer to offer high hydorphobicity, monomers with a perfluorinated group, such as 2,2,3,3,3-pentafluoropropyl (meth)acrylate, 2,2,3,3,4,4,4-heptafluorobutyl (meth)acrylate, 2,2,3,3,4,4,5,5-octafluoropentyl (meth)acrylate, 3,3,4,4,5,5,6,6,6-octafluoro-5-(trifluoromethyl)hexyl (meth)acrylate, 3,3,4,4,5,5,6,6,7,7,8,8,8-tridecafluorooctyl (meth)acrylate, 4,4,5,5,6,6,7,7,8,8,9,9,9-tridecafluoro-2-hydroxynonyl (meth)acrylate, 3,3,4,4,5,5,6,6,7,7,8,8,9,9,10,10,10-heptadecafluorodecyl (meth)acrylate and 3,3,4,4,5,5,6,6,7,7,8,8,9,9,10,10,11,11,12,12,12-heneicosafluorododecyl (meth)acrylate can be used.

For the comonomer, acryl, methacrylate, styrene or vinyl monomer used in the first step can be used. These comonomers reduce the film formation temperature because they have good film formation properties.

Monomers comprising the shell are added to the reactor when the transition ratio of monomers reaches 70–95% at the first step. The shell thickness of the coating particle is determined by the amount of the monomers used. The monomer amount are recommended to be used so that the shell content becomes 5–70 wt %, and more preferably, 10–40 wt % of the total coating material. If it is below 5 wt %, the shell may not surround the core completely, which becomes another cause of poor surface quality. On the other hand, if it exceeds 70 wt % the aim of production cost reduction cannot be attained.

Mixing ratio of the fluorinated monomers and comonomers are recommended to be 2:1–7:1 wt % to obtain superior water and oil repellency. If the mixing ratio falls outside this range, water repellency and oil repellency may reduce greatly when the amount of the fluorinated monomer decreases. Also, the fluorinated monomers are recommended to be used in 5–70 wt % of the total coating material. If the content is below 5 wt %, it is difficult to obtain superior surface quality. Otherwise if it exceeds 70 wt %, the production cost reduction effect is feeble.

As mentioned above, monomers to form the shell are added to the emulsion solution before the core latex reaction is completed. Therefore, particle growth due to secondary nucleation can be prevented and the preparation process can be simplified. As a result, the core and the shell are chemically bonded and a polymer similar to a block copolymer is obtained.

To summarize, the present invention offers preparation of core-shell coating materials with good water and oil repellency, wherein the core does not contain fluorinated monomers and the shell contains a large amount of fluorinated monomers. This invention contributes to production cost reduction. Also, it contributes to film formation reduction because comonomer with good film formation property is used to form the shell.

Hereunder is given a more detailed description of this invention based on examples. However, the following examples should not be construed as limiting the scope of this invention.

EXAMPLE 1

0.15 g of stearyl trimethyl ammonium chloride (a cationic surfactant) was dissolved in 40 g of distilled water. This solution was emulsified using a supersonic emulsifier together with 4 g of styrene monomer and 0.1 g of dodecanethiol (chain transfer agent). The emulsification solution was put in a cylinder reactor. After sealing the reactor, nitrogen gas was injected to offer nitrogen atmosphere. Then, the reactor was put in an oil bath of 65° C. 0.05 g of initiator [V50, 2,2-azobis(2-methylpropionamidine) dihydrochloride; WACO] dissolved in a small amount of water was added to initiate reaction. When the transition ratio of styrene reached about 90%, 2 g of 3,3,4,4,5,5,6,6,7,7,8,8,9,9,10,10,10-heptadecafluorodecyl acrylate (fluorinated monomer) was emulsified in 0.15 g of stearyl trimethyl ammonium chloride dissolved in 18 g of distilled water. After emulsification, the fluorinated monomer was injected at 0.1 ml/min using a syringe pump. Then, the reaction was continued for 4 hr to obtain core-shell particles.

33 wt % of fluorinated monomers was contained in the prepared core-shell particles. Transition ratio of the fluorinated monomers was measured by gas chromatography by taking small amount of samples while the reaction proceeds. Content of fluorinated monomers in the particles was measured by $^1$H-NMR analysis of dry sample. The particles coated on a glass plate. In order to observe the surface quality, the prepared core-shell particles were diluted to 0.5 wt % with distilled water. After drying moisture at room temperature, the glass plate was heat-treated at 130° C. for 24 hr. Then, contact angle was measured using distilled water, diiodomethane and dodecane.

Major properties and contact angle of the prepared core-shell particles are shown in Table 1.

EXAMPLES 2–9

Core-shell particles, wherein fluorinated monomers are contained in the shell, were prepared with the same method of Example 1. For the monomer to form the shell, 0.8 g of fluorinated monomer and 1.2 g of comonomer [methyl methacrylate (Example 2), ethyl methacrylate (Example 3), butyl methacrylate (Example 4), ethylhexyl methacrylate (Example 5), lauryl methacrylate (Example 6), octadecyl methacrylate (Example 7), styrene (Example 8), vinyl acetate (Example 9)] were used.

In Examples 2–9, 13.2 wt % of fluorinated monomers was contained in the monomers used to prepare the core-shell particles. And, about 13.2 wt % of fluorinated monomers was contained in the prepared core-shell particles.

Major properties and contact angle of the prepared core-shell particles are shown in Table 1.

Comparative Example 1

4 g of styrene monomer, 0.15 g of stearyl trimethyl ammonium chloride and 0.1 g of dodecanethiol were emulsified in 40 g of distilled water. After adding 0.05 g of initiator [V50; 2,2-azobis(2-methylpropionamidine) dihydrochloride; WACO), the reaction was performed for 5 hr to obtain polystyrene particles. The reaction condition was set identical to Example 1. Major properties and contact angle of the prepared polystyrene particles are shown in Table 1.

Comparative Example 2

4 g of 3,3,4,4,5,5,6,6,7,7,8,8,9,9,10,10,10-heptadecafluorodecyl acrylate monomer, 0.1 g of stearyl trimethyl ammonium chloride and 0.1 g of dodecanethiol were emulsified in 40 g of distilled water. After adding 0.05 g of an initiator [V50; 2,2-azobis(2-methylpropionamidine) dihydrochloride; WACO], the reaction was performed for 5 hr to obtain latex particles. The reaction condition was set identical to Example 1. Major properties and contact angle of the prepared latex particles are shown in Table 1.

Comparative Example 3

4 g of styrene, 2 g of 3,3,4,4,5,5,6,6,7,7,8,8,9,9,10,10,10-heptadecafluorodecyl acrylate, 0.3 g of stearyl trimethyl ammonium chloride and 0.1 g of dodecanethiol were emulsified in 58 g of distilled water. 0.05 g of an initiator [V50, 2,2-azobis(2-methylpropionamidine) dihydrochloride, WACO] was added to obtain random copolymer particles of styrene and fluorinated monomer. The reaction condition was set identical to Example 1. 33 wt % of fluorinated monomers was contained in the prepared random copolymer particles. Major properties and contact angle of the random copolymer particles are shown in Table 1.

Comparative Example 4

Polystyrene latex and fluorinated latex particles obtained in Comparative Examples 1 and 2 were mixed in 4:1. 20 wt % of fluorinated monomers was contained in the obtained particles. Major properties and contact angle of the prepared particles are shown in Table 1.

TABLE 1

| | Particle Type | Particle Size (nm)[1] | Final Transition Ratio (%)[2] | Film Formation Temperature (° C.)[3] | Contact Angle (°)[4] | | |
|---|---|---|---|---|---|---|---|
| | | | | | Distilled Water | Diiodo methane | Dodecane |
| Example 1 | Core-shell | 104 | 95.7 | 62 | 118.2 | 97.4 | 73.4 |
| Example 2 | Core-shell | 101 | 92.2 | 51 | 120.7 | 100.2 | 73.1 |
| Example 3 | Core-shell | 103 | 94.2 | 33 | 122.4 | 96.8 | 73.8 |
| Example 4 | Core-shell | 91 | 96.5 | 7 | 115.2 | 104.3 | 63.0 |
| Example 5 | Core-shell | 99 | 96.7 | <0 | 117.6 | 94.8 | 59.8 |
| Example 6 | Core-shell | 91 | 98.8 | <0 | 117.8 | 96.2 | 78.6 |
| Example 7 | Core-shell | 97 | 98.5 | 5 | 118.2 | 95.9 | 73.5 |
| Example 8 | Core-shell | 111 | 97.7 | 62 | 112.1 | 94.8 | 67.9 |
| Example 9 | Core-shell | 100 | 82.6 | 22 | 118.3 | 98.0 | 72.1 |

TABLE 1-continued

|  | Particle Type | Particle Size (nm)[1] | Final Transition Ratio (%)[2] | Film Formation Temperature (°C.)[3] | Contact Angle (°)[4] | | |
|---|---|---|---|---|---|---|---|
|  |  |  |  |  | Distilled Water | Diiodo methane | Dodecane |
| Comparative Example 1 | Homopolymer | 85 | 98.6 | 92 | 64.3 | 40.1 | — |
| Comparative Example 2 | Homopolymer | 142 | 98.1 | 65 | 116.9 | 98.1 | 73.2 |
| Comparative Example 3 | Irregular copolymer | 84 | 99.2 | 73 | 115.4 | 85.0 | 63.3 |
| Comparative Example 4 | Latex blend | — | — | — | 102.3 | 93.8 | 69.7 |

[1] Particle size (nm): Measured by optical scattering using a submicron particle analyzer (Coulter, N4).
[2] Final transition ratio (%): Measured by gas chromatography.
[3] Film formation temperature (° C.): Measured by minimum film formation temperature detector (Imoto, Japan).
[4] Contact angle (°): Measured with an optical goniometer (Rama-hart, 100 Series).

From Table 1, superiority in film formation property, water repellency and oil repellency of core-shell particles according to the present invention can be verified.

As mentioned above, the coating particles according to the present invention offers superior water and oil repellency while greatly reducing use of expensive fluorinated monomers. Also, use of the comonomer with good film formation property enables reduction of film formation temperature. In addition, preparation according to this invention is environment-friendly because no organic solvent is used. Consequently, the coating materials according to this invention can be utilized in textile surface treatment agents and paints with good water repellency and anti-fouling property.

What is claimed is:

1. A method of preparing fluorinated coating material with core-shell structure comprising steps of:
   1) synthesizing core latex by emulsion polymerization by using a monomer selected from a group consisting of an acrylate-based monomer, a methacrylate-based, a styrene-based and a vinyl-based monomer; a surfactant; distilled water, a chain transfer agent and a water-soluble initiator; and
   2) synthesizing a core-shell particle by adding fluorinated monomer alone or a mixture of a fluorinated monomer and a comonomer to form the shell when the convertion ratio of the monomer into a polymer in the above step 1) reaches 70–95%.

2. The method of preparing fluorinated coating material according to claim 1, wherein the reaction ratio of monomer/surfactant in step 1) is 1:0.001–1:0.2 in weight.

3. The method of preparing fluorinated coating material according to claim 1, wherein the mixture ratio of the fluorinated monomer and the comonomer in step 2) is 2:1–7:1 in weight.

4. The method of preparing fluorinated coating material according to claim 1, wherein said fluorinated monomer in step 2) is selected from a group consisting of 2,2,3,3,3-pentafluoropropyl (meth)acrylate, 2,2,3,3,4,4,4-heptafluorobutyl (meth)acrylate, 2,2,3,3,4,4,5,5-octafluoropentyl (meth)acrylate, 3,3,4,4,4,6,6,6-octafluoro-5-(trifluoromethyl)hexyl (meth)acrylate, 3,3,4,4,5,5,6,6,7,7,8,8,8-tridecafluorooctyl (meth)acrylate, 4,4,5,5,6,6,7,7,8,8,9,9,9-tridecafluoro-2-hydroxynonyl (meth)acrylate, 3,3,4,4,5,5,6,6,7,7,8,8,9,9,10,10,10-heptadecafluorodecyl (meth)acrylate and 3,3,4,4,5,5,6,6,7,7,8,8,9,9,10,10,11,11,12,12,12-heneicosafluorododecyl (meth)acrylate.

5. The method of preparing fluorinated coating material according to claim 1, wherein said comonomer in step 2) is selected from a group consisting of acrylate-based, methacrylate-based, styrene-based and vinyl-based monomers.

6. The method of preparing fluorinated coating material according to claim 1, wherein said shell comprises 5–70 wt % of the total core-shell coating material.

* * * * *